3,808,139
CHEMILUMINESCENT FORMULATIONS CONTAINING AN ALKYLSILOXANE

Everett M. Bens, China Lake, and Richard G. Brophy, Ridgecrest, Calif., assignors to the United States of America as represented by the Secretary of the Navy
No Drawing. Filed Sept. 30, 1964, Ser. No. 400,610
Int. Cl. C09k 3/00
U.S. Cl. 252—188.3                    6 Claims The invention herein described may be manufactured and used by or for the Government of the United States of America for governmental purposes without the payment of any royalties thereon or therefor.

The present invention relates to new chemiluminescent formulations.

Much research and experimentation is taking place in the area of luminescence. Various chemiluminescent compounds have been made but because most are liquid, their effectiveness is often dependent upon a carrier. Viscosity changes of the carrier influence the controllability and limit use; also, the life of the emission of light or "glow" is influenced. The present invention is for a new chemiluminescent formulation which has improved physical characteristics over those known.

It is an object of this invention to provide a chemiluminescent formulation which has controllable spreading characteristics.

Another object is to provide a chemiluminescent material which has use as a weapons sight marker.

Yet another object is to provide a chemiluminescent material which can be successfully used as a search and rescue aid.

Still another object is to produce a chemiluminescent formulation which can be spread on water.

A further object is to produce a chemiluminescent material which has continued emission of light both above and below the surface of the water.

The formulation comprises a homogeneous mixture of alkylsiloxanes, and chemiluminescent compounds such as peraminoethylenes. Dyes may or may not be added. Changes in the relative proportions of siloxanes, as well as the variety of viscosities permit control of surface spreading, especially on the surface of water. Changes in the proportion of peraminoethylenes, or similar chemiluminescent compounds, influence duration and/or intensity of light emission.

The siloxanes used herein are compounds composed of silicon and oxygen and usually contain carbon and hydrogen, and having in their molecules the structural unit $R_2SiO$ in which R is a member selected from the group consisting of $CH_3$, $C_2H_5$, $C_2H_4$, $C_6H_5$, and the like, or combinations thereof. The nature of the compound is influenced by the R groups and the extent of crosslinking. Silicone gums and fluids having predominantly high molecular weights were used. They include dimethylsilicone, a gum-like material sold under the name SE-76, methylsilicone, another gum sold as SE-30, methylvinylsilicone, a gum designated SE-31, methylphenylsilicone, a gum designated SF-1017, Viscasil 100,000, a high viscosity dimethylsilicone fluid, and tetraethoxysilicone, known as RTV-602. These materials were available commercially from General Electric. Others may be used such as Dow Corning's DC-710, a phenylmethylsiloxane.

Chemiluminescent compounds which are compatible with the silicones may be used. The peraminoethylenes were used in this invention, and they have the formula

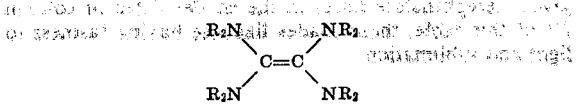

in which the R's which can be alike or different, are straight or branched chain alkyl or cycloalkyl hydrocarbon radicals of from 1–10 carbons each, preferably no more than five carbons each, which can be joined pairwise on nitrogen to form 3–5 membered monoaza heterocycles and on two nitrogens to form 3–7 membered diaza heterocycles. The first member of the series, namely, tetrakis(dimethylamino)ethylene can be prepared by the reaction of dimethylamine and chlorotrifluoroethylene, as reported by Pruett et al., J. Am. Chem. Soc., 72 3646 (1950). Although tetrakis(dimethylamino)ethylene was the one used in this invention because it was commercially available, other tetrakis(disubstituted amino)ethylenes could be successfully used as the chemiluminescent composition. These include
tetrakis(N-pyrrolidinyl)ethylene,
1,1′,3,3′-tetramethyl-$\Delta^{2,2'}$-bi(imidazolidine),
1,1′,3,3′-tetraethyl-$\Delta^{2,2'}$-bi(imidazolidine),
1,1′-diethyl-3,3′-dimethyl-$\Delta^{2,2'}$-bi(imidazolidine),
tetrakis(dimethylamino-methyleneamino)ethylene
and others.

The selected silicone and chemiluminescent compounds are mixed together in an inert atmosphere at room temperature until homogeneity results. The formulation is then stored in an air-tight container until used. When the material is left in the open air, the luminescence gradually decreases to a very faint glow, therefore, care must be taken to protect the formulation from reacting elements, air and water.

The following are representative examples of the successful formulation which exhibited controlled spreading on a water surface, little viscosity change due to temperature, and continued light emission despite occasional submergence in water. These examples better describe the invention but are not to be construed as limiting it.

EXAMPLE I

| Ingredients: | Percent by weight |
|---|---|
| Tetrakis(dimethylamino)ethylene | 50 |
| Dimethylsilicone | 50 |

The silicone used in the above example is a gum procured under the tradename SE-30. 0.3325 gram samples were applied to water and showed the following spread: 1″ x 1″ in one hour and 12 minutes; ½″ x 1½″ in two minutes; and 1⅜″ diameter in two hours and 45 minutes.

EXAMPLE II

| Ingredients: | Percent by weight |
|---|---|
| Tetrakis(dimethylamino)ethylene | 60 |
| Dimethylsilicone (SE-30) | 40 |

A 0.1256 gram sample of this formulation was applied to a water surface where it spread to a maximum diameter in 15 minutes, a 0.2726 gram sample spread to a 1⅜ inch diameter in 20 minutes; a 1.0162 gram sample spread to 2¾″ x 4¼″ in one hour; the last sample was 2¼″ x 4″ in 15 minutes, nearly that of its form one hour later. When the water was violently agitated no dispersion was observed but areas of the surface were observed to glow more brightly. The intensity of the light emission was found to decrease unless agitated. It was apparent that the life of the light emission was related to the quantity of material placed on the water.

EXAMPLE III

| Ingredients: | Percent by weight |
|---|---|
| Tetrakis(dimethylamino)ethylene | 25 |
| Dimethylsilicone (SE-30) | 8.3 |
| Dimethylsilicone (Viscasil oil 100,000) | 66.7 |

EXAMPLE IV

| Ingredients: | Percent by weight |
|---|---|
| Tetrakis(dimethylamino)ethylene | 47 |
| Methylvinylsilicone (SE-31) | 53 |

The silicone used in this formulation is a gum sold under the trade name SE-31. A 0.2214 gram sample applied to water showed the following spread: ½" x 1" in one minute; ⅞" x 1" in 17 minutes; 1" x 1¼" in one hour, 16 minutes and remained constant for at least three hours.

EXAMPLE V

Ingredients: Percent by weight
    Tetrakis(dimethylamino)ethylene _____ 50–93
    Tetraethoxysilicone (RTV-602) _____ 7–50

The silicone used above is sold under the trade name RVT-602. It was found that if too much of this silicone material was mixed with the chemiluminescent ingredient a jelly-like material formed which did not spread readily.

EXAMPLE VI

Ingredients: Percent by weight
    Tetrakis(dimethylamino)ethylene _____ 47
    Dimethylsilicone (Viscasil 100,000) _____ 53

A .022 gram sample of this formulation when spread on water gave a ⅝" diameter area in 15 minutes and the area remained constant thereafter.

EXAMPLE VII

Ingredients: Percent by weight
    Tetrakis(dimethylamino)ethylene _____ 40
    Dimethylsilicone (SE-30) _____ 30
    Dimethylsilicone (Viscasil oil 10,000) _____ 30

The SE-30 used is a gum and the Viscasil oil 10,000 is a high molecular weight material.

EXAMPLE VIII

Ingredients: Percent by weight
    Tetrakis(dimethylamino)ethylene _____ 47
    Dimethylsilicone (SE-30) _____ 53

The silicone used herein is a gum. A 0.908 gram sample applied on water gave the following spread: ⅝" x ⅞" in two minutes; ⅞" x 1" in 26 minutes; and 1" diameter in one hour 25 minutes.

EXAMPLE IX

Ingredients: Percent by weight
    Tetrakis(dimethylamino)ethylene _____ 47
    Methylphenylsilicone (SF-1017) _____ 53

Obviously many modifications and variations of the present invention are possible in the light of the above teachings. It is therefore to be understood that within the scope of the appended claims the invention may be practiced otherwise than as specifically described.

What is claimed is:

1. A chemiluminescent formulation comprising an alkylsiloxane and a tetrakis(disubstituted-amino)ethylene.

2. A chemiluminescent formulation comprising the following:

Ingredients: Percent by weight
    Tetrakis(dimethylamino)ethylene _____ 25 to 60
    Dimethylsilicone _____ 40 to 75

3. A chemiluminescent formulation comprising the following:

Ingredients: Percent by weight
    Tetrakis(dimethylamino)ethylene _____ 25
    Methylsilicone _____ 8.3
    Dimethylsilicone _____ 66.7

4. A chemiluminescent formulation comprising the following:

Ingredients: Percent by weight
    Tetrakis(dimethylamino)ethylene _____ 50 to 93
    Tetraethoxysilicone _____ 7 to 50

5. A chemiluminescent formulation comprising tetrakis(dimethylamino)ethylene and methylvinylsilicone.

6 A chemiluminescent formulation comprising tetrakis(dimethylamino)ethylene and methylvinylsilicone.

References Cited

UNITED STATES PATENTS 3,239,406   3/1966   Coffman et al. ___ 252—301.2 X
3,257,330   6/1966   Burzynski et al. __ 252—301.2 X STEPHEN J. LECHERT, JR., Primary Examiner U.S. Cl. X.R.

252—301.2